(12) United States Patent
Vonfeldt et al.

(10) Patent No.: US 6,739,023 B2
(45) Date of Patent: May 25, 2004

(54) METHOD OF FORMING A NONWOVEN COMPOSITE FABRIC AND FABRIC PRODUCED THEREOF

(75) Inventors: Mari-Pat Vonfeldt, Los Angeles, CA (US); Tara Tryphena Steinke, Corona, CA (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 130 days.

(21) Appl. No.: 10/197,736

(22) Filed: Jul. 18, 2002

(65) Prior Publication Data

US 2004/0010895 A1 Jan. 22, 2004

(51) Int. Cl.$^7$ .................................................. D04H 5/02
(52) U.S. Cl. ........................................... 28/104; 28/167
(58) Field of Search ........................ 28/104, 105, 106, 28/103, 107, 112, 111, 167, 166; 442/361, 362, 363, 381, 382, 383, 384, 387, 389, 401, 402, 408, 388; 264/500, 555, 557, 570

(56) References Cited

U.S. PATENT DOCUMENTS

| | | |
|---|---|---|
| 2,666,369 A | 1/1954 | Niks |
| 3,485,706 A | 12/1969 | Evans |
| 3,494,821 A | 2/1970 | Evans |
| 3,821,068 A | 6/1974 | Shaw |
| 4,100,324 A | 7/1978 | Anderson et al. |
| 4,152,480 A | 5/1979 | Adachi et al. |
| 4,298,649 A | 11/1981 | Meitner |
| 4,310,594 A | 1/1982 | Yamazaki et al. |
| 4,410,579 A | 10/1983 | Johns |
| 4,514,455 A | 4/1985 | Hwang |
| 4,818,464 A | 4/1989 | Lau |
| 4,902,559 A | 2/1990 | Eschwey et al. |
| 4,950,531 A | 8/1990 | Radwanski et al. |
| 4,997,611 A | 3/1991 | Hartmann |
| 5,124,111 A | 6/1992 | Keller et al. |
| 5,199,134 A | 4/1993 | Ripley |
| 5,284,703 A | 2/1994 | Everhart et al. |
| 5,290,628 A | 3/1994 | Lim et al. |
| 5,336,552 A | 8/1994 | Strack et al. |
| 5,355,565 A | 10/1994 | Baravian |
| 5,382,400 A | 1/1995 | Pike et al. |

(List continued on next page.)

FOREIGN PATENT DOCUMENTS

| | | |
|---|---|---|
| EP | 0216520 | 8/1986 |
| EP | 0624676 | 1/1998 |
| EP | 0546837 | 11/1998 |
| EP | 0933459 | 8/1999 |
| EP | 0765959 | 1/2000 |
| WO | 98/03710 | 1/1998 |
| WO | 98/09010 | 3/1998 |
| WO | 98/23804 | 6/1998 |
| WO | 98/45519 | 10/1998 |
| WO | 99/32288 | 7/1999 |
| WO | 00/18996 | 4/2000 |
| WO | 00/29657 | 5/2000 |
| WO | 00/36080 | 6/2000 |
| WO | 00/40789 | 7/2000 |
| WO | WO 01/88247 | 11/2001 |
| WO | 01/94673 | 12/2001 |

OTHER PUBLICATIONS

"Rotary Hydraulic Entanglement of Nonwovens", *Nonwovens World*, vol. 1, No. 3, Nov. 1986, pp. 76–80.

*Primary Examiner*—A. Vanatta
(74) *Attorney, Agent, or Firm*—Richard M. Shane

(57) ABSTRACT

The present invention provides a method of forming a nonwoven composite fabric that includes the steps of a) providing a first layer that includes splittable continuous fibers, b) splitting at least a portion of the splittable continuous fibers into split filaments, c) thereafter superposing a second layer and the first layer, wherein the second layer includes staple fibers, and d) entangling the first and second layers to form a composite fabric.

31 Claims, 2 Drawing Sheets

U.S. PATENT DOCUMENTS

| | | |
|---|---|---|
| 5,389,202 A | 2/1995 | Everhart et al. |
| 5,573,841 A | 11/1996 | Adam et al. |
| 5,759,926 A | 6/1998 | Pike et al. |
| 5,783,503 A | 7/1998 | Gillespie et al. |
| 5,853,635 A | 12/1998 | Morell et al. |
| 5,885,909 A | 3/1999 | Rudisill et al. |
| 5,895,710 A | 4/1999 | Sasse et al. |
| 5,902,754 A | 5/1999 | Nishijima et al. |
| 5,935,512 A | 8/1999 | Haynes et al. |
| 5,935,883 A | 8/1999 | Pike |
| 5,989,004 A | 11/1999 | Cook |
| 6,053,719 A | 4/2000 | Barbier et al. |
| 6,063,717 A | 5/2000 | Ishiyama et al. |
| 6,083,856 A | 7/2000 | Joseph et al. |
| 6,103,061 A | 8/2000 | Anderson et al. |
| 6,177,370 B1 | 1/2001 | Skoog et al. |
| 6,200,669 B1 | 3/2001 | Marmon et al. |
| 6,228,490 B1 | 5/2001 | Nagano et al. |
| 6,350,399 B1 | 2/2002 | Cook et al. |
| 6,352,948 B1 * | 3/2002 | Pike et al. .................. 442/384 |
| 6,502,288 B2 * | 1/2003 | Black et al. .................. 28/104 |
| 6,624,100 B1 * | 9/2003 | Pike .......................... 442/340 |
| 2002/0028623 A1 * | 3/2002 | Carlson et al. ............. 442/401 |
| 2002/0034914 A1 * | 3/2002 | De Leon et al. ............... 28/104 |
| 2003/0118776 A1 * | 6/2003 | Anderson et al. ........... 428/152 |

* cited by examiner

METHOD OF FORMING A NONWOVEN COMPOSITE FABRIC AND FABRIC PRODUCED THEREOF

FIELD OF THE INVENTION

The present invention generally relates to the preparation and manufacture of absorbent wiper materials. More particularly, the present invention relates to the preparation and manufacture of absorbent wiper materials that comprise split filaments and staple fibers.

BACKGROUND

It is known in the art that nonwoven materials of splittable thermoplastic filaments can be manufactured by a variety of processes. Generally, splittable thermoplastic filaments are produced by spinning two different polymers into a filament such that the two polymers form longitudinal heterogeneous cross-sections within the filaments. For example, side-by-side configurations may be formed in which the first polymer forms one side of the filament and the second polymer forms the other side. Many other configurations such as sheath-core or islands-in-the-sea are known in the art.

The filaments containing the longitudinal heterogeneous cross-sections can be split according to a variety of mechanisms described in the art. By way of example, U.S. Pat. No. 5,759,926 to Pike et al. discloses a mechanism whereby fibrillation is induced by contacting the filaments containing the longitudinal heterogeneous cross-sections with hot water. Mechanical agitation and differential shrinkage are additional mechanisms that may be employed. As further examples, U.S. Pat. No. 3,485,706 to Evans, U.S. Pat. No. 5,355,565 to Baravian, and U.S. Pat. No. 6,200,669 to Marmon et al. each disclose processes whereby unitary multicomponent fibers are split by a hydroentangling process that separates the individual segments of the unitary multicomponent fibers into microfibers.

It is also known in the art that staple fibers can be added to a nonwoven web to enhance absorbency. There are a variety of methods known to incorporate pulp fibers into the nonwoven fiber matrix. U.S. Pat. No. 4,818,464 to Lau and U.S. Pat. No. 4,100,324 to Anderson et al. describe coform processes that incorporate pulp fibers into meltblown fibers via an air laying process. U.S. Pat. No. 4,902,559 to Eschwey et al. discloses a process for the production of an absorbent nonwoven material formed of randomly distributed thermoplastic endless filaments which contain embedded hydrophilic or oleophilic staple fibers. U.S. Pat. No. 5,389,202 to Everhart et al. and WO00/29657(Haynes et al.) both describe a process of hydroentangling pulp fibers into a continuous filament nonwoven web. With regard to WO00/29657(Haynes et al.), a process is disclosed whereby pulp fibers are entangled into a matrix of splittable filaments followed by splitting of the filaments to entrap the pulp fibers. However, such process can result in incomplete splitting of the filaments due to the pulp fibers shielding the splittable filaments from the water jets.

There remains a need for a soft, strong, and absorbent nonwoven material and a process for making such a material. More specifically, there remains a need for an efficient and effective process to produce composites of staple fibers and low denier continuous filaments.

SUMMARY OF THE INVENTION

The present invention comprises a method of forming a nonwoven composite fabric that includes a) providing a first layer that includes splittable continuous fibers, b) splitting at least a portion of the splittable continuous fibers into split filaments, c) thereafter superposing a second layer and the first layer, wherein the second layer includes staple fibers, and d) entangling the first and second layers to form a composite fabric. Desirably, the split filaments are substantially continuous in length.

In one aspect, the splitting step may comprise impinging the splittable continuous fibers with high energy jets such as, for example, high energy water jets. In a further aspect, the entangling step may include impinging the superposed first and second layers with high energy jets such as, for example, high energy water jets. The high energy jets of the entangling step are desirably directed at the exposed surface of the second layer. Desirably, the entangling jets are supplied through first orifices, the hydraulic pressure at the first orifices ranging from about 2,500 kPa to about 21,000 kPa. Desirably, the splitting jets are supplied through second orifices, the hydraulic pressure at the second orifices ranging from about 1,300 kPa to about 14,000 kPa. In an even further aspect, the hydraulic pressure at the second orifices is lower than the hydraulic pressure at the first orifices.

The composite fabric produced by the method of the present invention may include a staple fiber rich side. Alternatively, the composite fabric produced by the method of the present invention may be characterized by staple fibers that are entangled substantially uniformly throughout the cross section of the composite fabric.

The method of the present invention desirably produces a composite fabric wherein at least about 25% of the splittable continuous fibers are at least partially split. Still more desirably, the method of the present invention produces a composite fabric wherein at least about 50%, 75%, 90, or even 95% of the splittable continuous fibers are at least partially split. In one embodiment of the present invention, the entangling step optionally does not result in substantial additional splitting of the splittable continuous fibers.

In a further aspect, the multicomponent fibers are desirably selected to split in a manner such that the split filaments have a denier of less than about 0.7, and still more desirably, a denier of less than about 0.1, and even more desirably, a denier of less than about 0.01.

In a further aspect the splittable continuous fibers of the present invention include spunbond fibers. The spunbond fibers desirably include a first thermoplastic polymer and a second thermoplastic polymer arranged in distinct zones across the cross-section of the fibers wherein the first and second thermoplastic polymers are incompatible with each other. Further, the staple fibers of the present invention desirably include pulp fibers.

In a further aspect, the ratio of the dry weight of the first layer to the dry weight of the second layer desirably ranges from about 0.05 to about 9, more desirably, from about 0.1 to about 2, and even more desirably, from about 0.2 to about 1.

These and other features and advantages of the present invention will become apparent after a review of the following detailed description of the disclosed embodiments.

BRIEF DESCRIPTIONS OF THE DRAWINGS

DEFINITIONS

As used herein, the term "substantially continuous filaments or fibers" refers to filaments or fibers prepared by extrusion from a spinneret, including without limitation spunbonded and meltblown fibers, which are not cut from their original length prior to being formed into a nonwoven web or fabric. Substantially continuous filaments or fibers may have average lengths ranging from greater than about 15 cm to more than one meter, and up to the length of the web or fabric being formed. The definition of "substantially continuous filaments or fibers" includes those which are not cut prior to being formed into a nonwoven web or fabric, but which are later cut when the nonwoven web of fabric is cut.

As used herein, the term "multicomponent filaments or fibers" refers to fibers which have been formed from at least two polymer components. Such fibers are usually extruded from separate extruders but spun together to form one fiber. The polymers of the respective components are usually different from each other although multicomponent fibers may comprise separate components of similar or identical polymeric materials. The individual components are typically arranged in substantially constantly positioned distinct zones across the cross-section of the fiber and extend substantially along the entire length of the fiber.

As used herein and in the claims, the terms "comprising" and "comprises" are inclusive or open-ended and do not exclude additional unrecited elements, compositional components, or method steps.

DETAILED DESCRIPTION

The process of the present invention includes the steps of superposing a layer of staple fibers with a layer of split continuous filaments, hydroentangling the layers to form a contiguous nonwoven composite material.

Figure 1:
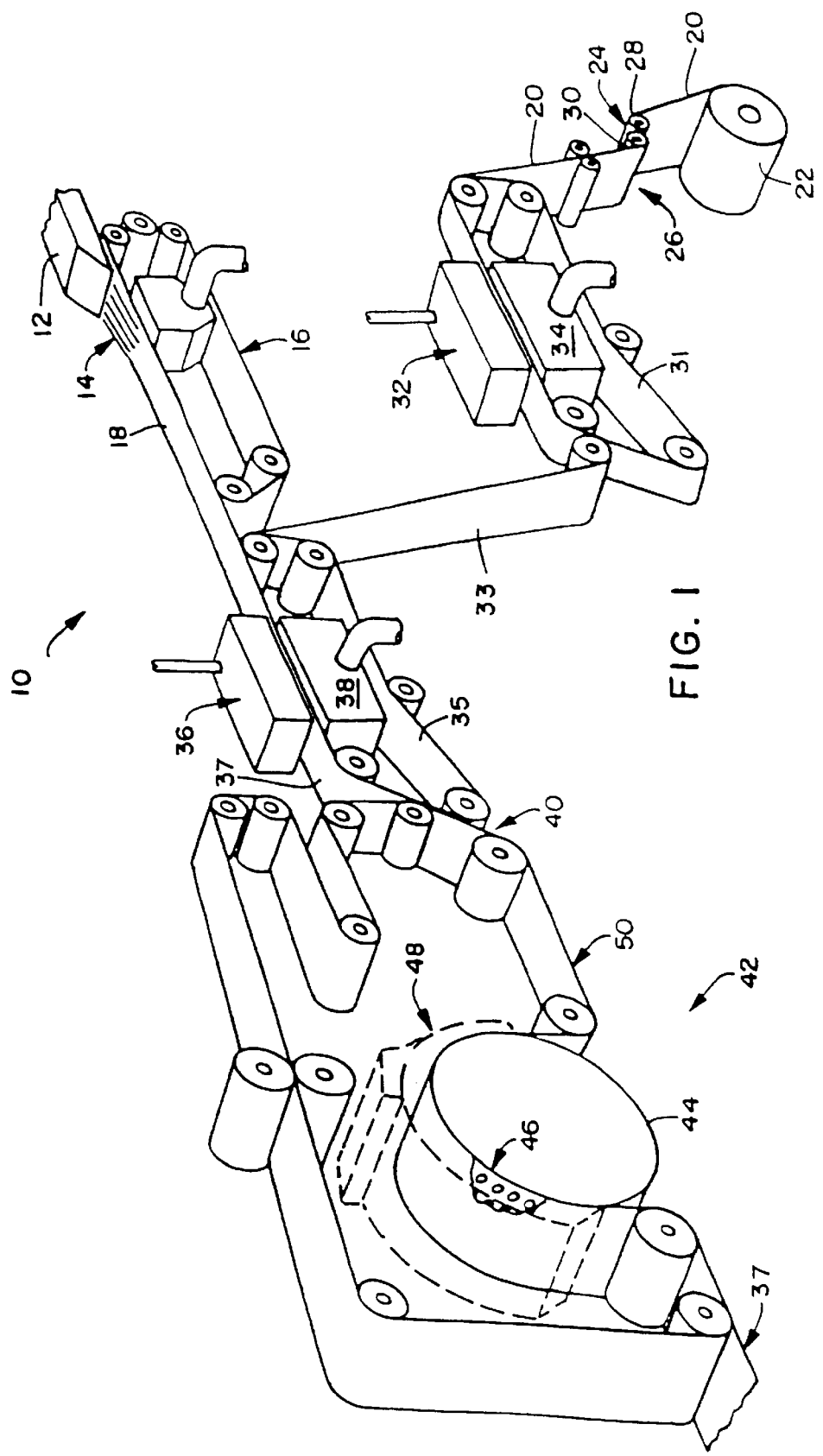
FIG. 1 is a schematic of an exemplary process for making a hydroentangled composite fabric.

Referring to FIG. 1 of the drawings there is schematically illustrated at 10 a process for forming a hydroentangled composite fabric. According to the present invention, a suspension of staple fibers is supplied by a headbox 12 and deposited via a sluice 14 in a dispersion onto a forming fabric 16 of a conventional wet-forming machine. However, while reference is made herein to formation of a staple fiber web by wet-forming processes, it is to be understood that the staple fiber web could alternatively be manufactured by other conventional process such as for example, carding, airlaying, drylaying, and so forth.

The suspension of staple fibers may be of any consistency that is typically used in conventional wet-forming processes. For example, the suspension may contain from about 0.01 to about 1.5 percent by weight staple fibers suspended in water. Water is removed from the suspension of staple fibers to form a uniform layer of staple fibers 18.

The staple fibers may be of any average fiber length suitable for use in conventional wet forming processes. By way of nonlimiting example, pulp fiber is a staple fiber that is useful in the present invention. As a nonlimiting example, the staple fibers may have an average fiber length from about 1.5 mm to about 6 mm. Desirable pulp fibers include those having lower average fiber lengths including, but not limited to, certain virgin hardwood pulps and secondary (i.e. recycled) fiber pulp from sources such as, for example, newsprint, reclaimed paperboard, office waste, and so forth. Pulp fibers from these sources typically have an average fiber length of less than about 1.2 mm, for example, from 0.7 mm to 1.2 mm. Other suitable staple fibers include, but are not limited to, rayon staple fibers, polyester staple fibers, nylon staple fibers, polypropylene staple fibers, polyethylene staple fibers, and so forth.

When pulp fibers are used in the present invention, they may be unrefined or may be beaten to various degrees of refinement. Wet-strength resins and/or resin binders may be added to improve strength and abrasion resistance as desired. Useful binders and wet-strength resins are known to those skilled in the papermaking art. Cross-linking agents and/or hydrating agents may also be added to the pulp. Debonding agents may be added to the pulp to reduce the degree of hydrogen bonding if a very open or loose pulp fiber web is desired. Useful debonding agents are known to those skilled in the papermaking art. The addition of certain debonding agents also may reduce the static and dynamic coefficients of friction. The debonder is believed to act as a lubricant or friction reducer.

Referring again to FIG. 1 of the drawings, a continuous filament nonwoven substrate 20 is unwound from a supply roll 22. The nonwoven substrate 20 passes through a nip 24 of an S-roll arrangement 26 formed by the stack rollers 28 and 30. In an alternate embodiment (not shown) the nonwoven substrate could be made in-line prior to being directed to the nip 24. The precise arrangement of the rollers is not believed to be critical to the present invention.

The nonwoven substrate 20 comprises splittable multicomponent fibers that are adapted to be split, at least in part, by induction of mechanical stresses. Forming a substrate of splittable multicomponent fibers may be accomplished by a variety of methods described in the art. The nonwoven substrate 20 may be formed by known continuous filament nonwoven extrusion processes, such as, for example, known solvent spinning or melt-spinning processes, for example, spunbonding. For example, U.S. Pat. No. 5,989,004 to Cook, the entire contents of which are incorporated herein by reference, discloses a spin pack which is useful in the manufacture of such multicomponent fibers. As further examples, U.S. Pat. No. 5,382,400 to Pike et al., the entire contents of which are incorporated herein by reference, discloses production of crimped multicomponent fibers and U.S. Pat. No. 5,759,926 to Pike et al., the entire contents of which are incorporated herein by reference, discloses splittable multicomponent fibers that dissociate quickly when contacted with hot water.

Figure 2:
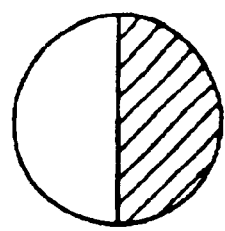
FIGS. 2–4 are cross-sectional views of exemplary multicomponent fibers suitable for use with the present invention.
Figure 3:
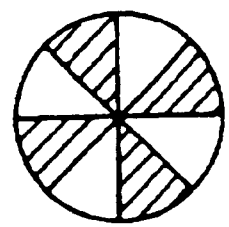
Figure 4:
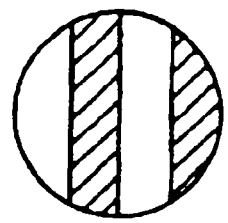

In fabricating the substrate of splittable multicomponent fibers it is desirable to form fibers that comprise a plurality of contiguous individual segments that run substantially parallel to the longitudinal axis of the fiber. It is also desirable that the splittable multicomponent fiber comprises a number of interfaces between the individual segments that extend to the outer surface of the multicomponent fiber to serve as points where the splitting process can be initiated. For example, referring to FIG. 2, a side by side configuration is shown having a single interface between two individual segments that extends to the outer surface of the multicomponent fiber at two points. In another example, referring to FIG. 3, a plurality of wedge-shaped segments comprises the multicomponent fiber resulting in a plurality of interfaces between the wedges that extend to the outer surface of the multicomponent fiber. Still other variations are suitable. In yet another example, referring to FIG. 4, a plurality of slice shaped segments extending across the cross-sectional area of the filament comprises the multicomponent fiber resulting in a plurality of interfaces between the slices that extend to the outer surface of the multicomponent fiber.

The practice of the present invention is not limited to solid, circular shaped filaments. Individual segments can be formed in multicomponent fibers having shapes that include but are not limited to square, rectangular, trapezoidal, rhombic, bilobal, trilobal, multilobal, dog bone, ribbon, hollow, and so forth.

The splitting of the multicomponent fibers into a plurality of individual segments results in a matrix having lower denier than the multicomponent fiber. The greater the number of individual segments that exist in the multicomponent fiber, the greater is the potential for forming lower denier fibers. For example, it may be difficult to produce spunbond fibers of less than about 1.0 denier. However, by splitting the multicomponent filaments it is possible to achieve split filament sizes of, for example, less than about 0.7 denier, less than about 0.5 denier, less than 0.1 denier, less than about 0.01 denier, and so forth, depending on the size of the splittable fiber and the configuration and number of the individual segments within the fiber.

Splitting of the multicomponent fibers is enhanced when the adjoining segments within the fiber comprise incompatible polymers such that miscibility of the polymers at the interface between the segments is minimized. Illustrative examples of pairs of incompatible polymeric materials that are suitable for the formation of multicomponent fibers that can be split into segments include but are not limited to polyolefins with polyamides, for example, polyethylene with nylon 6, polyethylene with nylon 6/6, polypropylene with nylon 6, and polypropylene with nylon 6/6; polyolefin with polyester, for example, polyethylene with polyethylene terephthalate, polypropylene with polyethylene terephthalate, polyethylene with polybutylene terephthalate and polypropylene with polybutylene terephthalate; and polyamide with polyester, for example, nylon 6 with polyethylene terephthalate, nylon 6/6 with polyethylene terephthalate, nylon 6 with polybutylene terephthalate, and nylon 6/6 with polybutylene terephthalate, and so forth. Other incompatible polymers may also be employed, as well as blends thereof.

The nonwoven substrate 20 may have a basis weight from about 10 to about 70 grams per square meter (gsm). Desirably, the nonwoven substrate 20 may have a basis weight from about 10 to about 35 gsm. The polymers that comprise the nonwoven substrate may include additional materials such as, for example, pigments, antioxidants, flow promoters, stabilizers and so forth.

The nonwoven continuous splittable filament substrate 20 may be bonded prior to the splitting process. Desirably, the nonwoven continuous filament substrate 20 has a total bond area of less than about 30 percent and a uniform bond density greater than about 100 bonds per square inch. For example, the nonwoven continuous filament substrate may have a total bond area from about 2 to about 30 percent (as determined by conventional optical microscopic methods) and a bond density from about 250 to about 500 pin bonds per square inch.

Such a combination total bond area and bond density may be achieved by bonding the continuous filament substrate with bonding rolls having various bond patterns. By way of example only, a suitable pin bond pattern has more than about 100 pin bonds per square inch which provides a total bond surface area less than about 30 percent when fully contacting a smooth anvil roll. Desirably, the bond pattern may have a pin bond density from about 250 to about 350 pin bonds per square inch and a total bond surface area from about 10 percent to about 25 percent when contacting a smooth anvil roll.

Although pin bonding produced by thermal bond rolls is described above, the present invention contemplates any form of bonding which produces good tie down of the filaments with minimum overall bond area. For example, a combination of thermal bonding and latex impregnation may be used to provide desirable filament tie down with minimum bond area. Alternatively and/or additionally, a resin, latex or adhesive may be applied to the nonwoven continuous filament web by, for example, spraying or printing, and dried to provide the desired bonding.

Referring again to FIG. 1, the continuous filament nonwoven substrate layer 20 is then transferred to a foraminous splitting surface 31 of a conventional hydraulic entangling machine. The continuous filament nonwoven substrate layer 20 passes under one or more hydraulic splitting manifolds 32 and is treated with jets of fluid to split the multicomponent continuous filaments into the component parts.

Alternatively, hydraulic splitting may take place while the nonwoven substrate 20 is on the same foraminous screen (i.e., mesh fabric) upon which the splittable fiber forming process took place. The fluid impacts the nonwoven substrate 20 which is supported by the foraminous splitting surface 31 which may be, for example, a single plane mesh having a mesh size of from about 40×40 to about 100×100. The foraminous splitting surface 31 may also be a multi-ply mesh having a mesh size from about 50×50 to about 200×200. As is typical in many water jet treatment processes, vacuum slots 34 may be located directly beneath the hydraulic manifolds 32 or beneath the foraminous splitting surface 31 downstream of the hydraulic manifold so that excess water is withdrawn from the split fiber composite material 33.

Splitting of the continuous multicomponent fibers prior to the incorporation of staple fibers is an important aspect of the invention in that it allows the full energy of the jets to directly impact the splittable multicomponent fibers. This results in a high splitting efficiency. For example, it can be expected that at least about 25% of the splittable filaments are at least partially split. Desirably, at least about 50%, 75%, 90%, or even 95% of the splittable filaments are at least partially split. If the splitting and hydroentangling were to be completed in a single step, it can be expected that fewer splits would be accomplished as the staple fibers could absorb energy that otherwise would be directed to the unsplit fibers.

The hydraulic splitting may be accomplished utilizing conventional hydraulic entangling processes and equipment such as may be found in U.S. Pat. No. 3,485,706 to Evans, the entire contents of which is incorporated herein by reference. Hydraulic entangling techniques are also disclosed in an article by Honeycomb Systems, Inc., Biddeford, Me., entitled "Rotary Hydraulic Entanglement of Nonwovens," reprinted from INSIGHT 86 INTERNATIONAL ADVANCED FORMING/BONDING CONFERENCE, the entire contents of which are likewise incorporated herein by reference.

The splitting may be carried out with any appropriate working fluid such as, for example, water. The working fluid flows through a manifold that evenly distributes the fluid to a series of individual holes or orifices. These holes or orifices may be, for example, from about 0.07 to about 0.4 millimeters in diameter and may be arranged in one or more rows with any number of orifices, e.g. 15–40 per centimeter, in each row. Many other manifold configurations may be used, for example, a single manifold may be used or several manifolds may be arranged in succession. The splittable multicomponent fiber substrate may be supported on an apertured support, while treated by streams of liquid from jet devices. The support can be a mesh screen or forming wires. The support can also have a pattern so as to form a nonwoven material with such a pattern therein. Fiber splitting may be accomplished by jetting fine, essentially columnar, liquid streams toward the surface of the supported substrate. The supported substrate is traversed with the streams until the fibers are split. The impact of the pressurized streams of water causes the individual segments or components forming the unitary multicomponent fiber to separate. The bonded substrate may be passed through the hydraulic entangling apparatus a number of times on one or both sides.

The total energy imparted to the multicomponent fibers may be increased by increasing the number of orifices, increasing the hydraulic pressure in the nozzles, increasing the total volumetric flow, decreasing the speed of the nonwoven passing under the nozzles, or decreasing the basis weight of the nonwoven. By way of example only, generating the split filament precursor webs of the present invention will involve employing water pressures from about 2,500 to about 21,000 kPa. Desirably, the number, placement and pressure of the jets in the splitting process are configured to impart sufficient energy to generate the desired degree of separation. However, the use of the lowest practicable energy, in particular lower water pressure, is desirous since this requires considerable less energy and recycling of fluid, thereby lowering production costs. In addition, the ability to achieve good separation at lower energy levels may translate into the ability to use higher production speeds at the same water pressure.

Although the pressure required to separate particular multicomponent fibers will depend on numerous factors, it is noted that substantial separation at lower water pressures may be achieved by the formation of higher quality cross-sectional shaped segments and/or by utilizing polymeric materials in adjacent segments that do not readily adhere to one another. In addition, greater separation may be achieved, in part, by subjecting the splittable multicomponent fibers to the splitting process two or more times. It has been found that subjecting each side of the splittable substrate of multicomponent fibers to the splitting process significantly enhances the degree of separation. Thus, it is desirable that the splittable multicomponent fiber substrate be subjected to at least one run under the splitting apparatus wherein the water jets are directed to the first side and an additional run wherein the water jets are directed to the opposed side of the splittable fiber substrate.

Just as the splittable fibers may be bonded as described above before they are split, the split filaments may be bonded after the splitting process. Desirably, the nonwoven continuous multicomponent filament/split filament substrate 33 will have a total bond area of less than about 30 percent and a uniform bond density greater than about 100 bonds per square inch. By way of example only, the nonwoven continuous multicomponent filament/split filament substrate 33 may have a total bond area from about 2 to about 30 percent and a bond density from about 250 to about 500 pin bonds per square inch. Suitable bonding patterns are as described above.

Although pin bonding produced by thermal bond rolls is described above, the present invention contemplates any form of bonding which produces good tie down of the multicomponent filaments and/or split filaments with minimum overall bond area. For example, a combination of thermal bonding and latex impregnation may be used to provide desirable multicomponent filament/split filament tie down with minimum bond area. Alternatively and/or additionally, a resin, latex or adhesive may be applied to the nonwoven continuous multicomponent filament/split filament web by, for example, spraying or printing, and dried to provide the desired bonding.

The staple fiber layer 18 is then laid on the split continuous filament substrate 33 which rests upon a foraminous entangling surface 35 of a conventional hydraulic entangling machine. It is desirable that the staple fiber layer 18 is between the split continuous filament substrate 33 and the hydraulic entangling manifolds 36. The staple fiber layer 18 and split continuous filament substrate 33 pass under one or more hydraulic entangling manifolds 36 and are treated with jets of fluid to entangle the staple fibers with the multicomponent filaments and split filaments of the split continuous filament substrate 33. The jets of fluid also drive staple fibers into and through the split continuous filament substrate 33 to form the composite material 37.

Alternatively, hydraulic entangling may take place while the staple fiber layer 18 and split continuous filament substrate 33 are on the same foraminous screen (i.e., mesh fabric) upon which the wet-laying took place. The present invention also contemplates superposing a dried staple sheet on a split continuous filament substrate, re-hydrating the dried staple sheet to a specified consistency and then subjecting the re-hydrated staple sheet to hydraulic entangling.

The hydraulic entangling may take place while the staple fiber layer 18 is highly saturated with water. For example, the staple fiber layer 18 may contain up to about 90 percent by weight water just before hydraulic entangling. Alternatively, the staple fiber layer may be an air-laid or dry-laid layer of staple fibers.

Hydraulic entangling a wet-laid layer of staple fibers is desirable because the staple fibers can be embedded into and/or entwined and tangled with the split continuous filament substrate 33 without interfering with "paper" bonding (sometimes referred to as hydrogen bonding) since the staple fibers are maintained in a hydrated state. "Paper" bonding also appears to improve the abrasion resistance and tensile properties of a high staple content composite fabric. "Paper" bonding can be especially significant when the staple fibers include pulp fibers that are particularly capable of hydrogen bonding.

The hydraulic entangling may be accomplished utilizing conventional hydraulic entangling equipment such as was described above. The hydraulic entangling may be carried out with any appropriate working fluid such as, for example, water. The working fluid flows through a manifold that evenly distributes the fluid to a series of individual holes or orifices. By way of nonlimiting example, these holes or orifices may be from about 0.07 to about 0.4 millimeters in diameter. For example, the invention may be practiced utilizing a manifold containing a strip having 0.2 millimeter diameter orifices, 12 holes per centimeter, and 1 row of holes. Many other manifold configurations and combinations may be used. For example, a single manifold may be used or several manifolds may be arranged in succession.

In the hydraulic entangling process, the working fluid desirably passes through the orifices at a pressures ranging from about 1,300 to about 14,000 kPa. At the upper ranges of the described pressures it is contemplated that the composite fabrics may be processed at speeds of about 300 meters per minute. The fluid impacts the staple fiber layer 18 and the split continuous filament substrate 33 which are supported by a foraminous entangling surface 35 which may be, for example, a single plane mesh having a mesh size of from about 40×40 to about 100×100. The foraminous entangling surface 35 may also be a multi-ply mesh having a mesh size from about 50×50 to about 200×200. As is typical in many water jet treatment processes, vacuum slots 38 may be located directly beneath the hydraulic entangling manifolds 36 or beneath the foraminous entangling surface 35 downstream of the hydraulic entangling manifold 36 so that excess water is withdrawn from the hydraulically entangled composite material 37.

Although the inventors do not wish to be held to a particular theory of operation, it is believed that the columnar jets of working fluid which directly impact the staple fibers laying on the nonwoven continuous filament substrate work to drive those fibers into and partially through the matrix or nonwoven network of multicomponent filaments and split filaments in the substrate. When the fluid jets and staple fibers interact with a nonwoven continuous multicomponent filament and split filament web, the staple fibers are entangled with filaments of the nonwoven web and with each other. The degree of entanglement that may be achieved is dependent upon the degree to which the continuous multicomponent filaments and split filaments have been bonded together. If the nonwoven continuous filament substrate is too loosely bonded, the filaments are generally too mobile to form a coherent matrix to secure the staple fibers. On the other hand, if the total bond area of the substrate is too great, the staple fiber penetration may be poor. Moreover, too much bond area will also cause a non-uniform composite fabric because the jets of fluid will splatter, splash and wash off staple fibers when they hit the large non-porous bond spots. The appropriate levels of bonding, as described above, provide a coherent substrate that may be formed into a staple fiber composite fabric by hydraulic entangling on only one side and still provide a strong, useful fabric as well as a composite fabric having desirable dimensional stability.

In one aspect of the invention, the energy of the fluid jets that impact the staple layer and split continuous filament substrate may be adjusted so that the staple fibers are inserted into and entangled with the split continuous filament substrate in a manner that enhances the two-sidedness of the fabric. That is, the entangling may be adjusted to produce high staple fiber concentration on one side of the fabric and a corresponding low staple fiber concentration on the opposite side. Such a configuration may be particularly useful for special purpose wipers and for personal care product applications such as, for example, disposable diapers, feminine pads, adult incontinence products and the like. Alternatively, the continuous filament substrate may be entangled with a staple fiber layer on one side and a different staple fiber layer on the other side to create a composite fabric with two staple-rich sides. In that case, hydraulically entangling both sides of the composite fabric is desirable.

After the fluid jet treatment, the composite fabric 37 may optionally be transferred to a drying operation, desirably a non-compressive drying operation. A differential speed pickup roll 40 may be used to transfer the material from the hydraulic entangling foraminous surface 35 to a non-compressive drying operation. Alternatively, conventional vacuum-type pickups and transfer fabrics may be used. If desired, the composite fabric may be wet-creped before being transferred to the drying operation. Non-compressive drying of the web may be accomplished utilizing a conventional rotary drum through-air drying apparatus shown in FIG. 1 at 42. The through-dryer 42 may be an outer rotatable cylinder 44 with perforations 46 in combination with an outer hood 48 for receiving hot air blown through the perforations 46. A through-dryer belt 50 carries the composite fabric 37 over the upper portion of the through-dryer outer cylinder 40. The heated air forced through the perforations 46 in the outer cylinder 44 of the through-dryer 42 removes water from the composite fabric 37. The temperature of the air forced through the composite fabric 36 by the through-dryer 42 may vary in accord with the line speed, percent saturation, atmospheric conditions, etc. The drying air may be heated or at ambient temperature. By way of example only, the temperature of the air forced through the composite fabric 36 by the through-dryer 42 desirably ranges from about 93° C. to about 260° C. Other useful through-drying methods and apparatus may be found in, for example, U.S. Pat. No. 2,666,369 to Niks, the entire contents of which are incorporated herein by reference, and U.S. Pat. No. 3,821,068 to Shaw, the entire contents of which are incorporated herein by reference.

It may be desirable to use finishing steps and/or post treatment processes to impart selected properties to the composite fabric 37. For example, the fabric may be lightly pressed by calender rolls, creped or brushed to provide a uniform exterior appearance and/or certain tactile properties. Alternatively and/or additionally, chemical post-treatments such as, adhesives or dyes may be added to the fabric.

In a further aspect of the invention, the fabric may contain various materials such as, for example, activated charcoal, clays, starches, and superabsorbent materials. For example, these materials may be added to the suspension of staple fibers used to form the staple fiber layer. These materials may also be deposited on the staple fiber layer prior to the fluid jet treatments so that they become incorporated into the composite fabric by the action of the fluid jets. Alternatively and/or additionally, these materials may be added to the composite fabric after the fluid jet treatments. If superabsorbent materials are added to the suspension of staple fibers or to the staple fiber layer before water-jet treatments, it is preferred that the superabsorbents are those which can remain inactive during the wet-forming and/or water-jet treatment steps and can be activated later. Conventional superabsorbents may be added to the composite fabric after the water-jet treatments. Useful superabsorbents are known to those skilled in the art of absorbent materials. Superabsorbents are desirably present at a proportion of up to about 50 grams of superabsorbent per 100 grams of staple fibers in the staple fiber layer. For example, the nonwoven web may contain from about 15 to about 30 grams of superabsorbent per 100 grams of staple fibers. As a further example, the nonwoven web may contain about 25 grams of superabsorbent per 100 grams of staple fibers.

While the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

What is claimed is:

1. A method of forming a nonwoven composite fabric comprising the steps of:
    providing a first layer comprising splittable continuous fibers;
    splitting at least a portion of the splittable continuous fibers into split filaments;
    thereafter, superposing a second layer and said first layer, wherein said second layer comprises staple fibers; and
    entangling the first and second layers to form a composite fabric.

2. The method of claim 1 wherein the splitting step comprises impinging the splittable continuous fibers with high energy jets.

3. The method of claim 2 wherein the jets comprise water.

4. The method of claim 3 further comprising the step of drying the composite fabric.

5. The method of claim 1 wherein the split filaments are substantially continuous in length.

6. The method of claim 1 wherein the entangling step comprises impinging the superposed first and second layers with high energy jets.

7. The method of claim 6 wherein the jets comprise water.

8. The method of claim 6 wherein the jets are directed at the exposed surface of the second layer.

9. The method of claim 7 further comprising the step of drying the composite fabric.

10. The method of claim 1 wherein the composite fabric comprises a staple fiber rich side.

11. The method of claim 1 wherein the staple fibers are entangled substantially uniformly throughout the cross section of the composite fabric.

12. The method of claim 1 wherein the entangling step does not result in substantial additional splitting of the splittable continuous fibers.

13. The method of claim 1 wherein at least about 50% of the splittable continuous fibers are at least partially split.

14. The method of claim 1 wherein at least about 75% of the splittable continuous fibers are at least partially split.

15. The method of claim 1 wherein at least about 90% of the splittable continuous fibers are at least partially split.

16. The method of claim 1 wherein at least a substantial portion of the split filaments have a denier of less than about 0.7.

17. The method of claim 16 wherein a majority of the split filaments have a denier of less than about 0.7.

18. The method of claim 1 wherein at least a substantial portion of the split filaments have a denier of less than about 0.1.

19. The method of claim 1 wherein the splittable continuous fibers comprise spunbond fibers.

20. The method of claim 19 wherein the spunbond fibers comprise a first thermoplastic polymer and a second thermoplastic polymer arranged in distinct zones across the cross-section of the fibers, the first and second thermoplastic polymers being incompatible with each other.

21. The method of claim 1 wherein the staple fibers comprise pulp fibers.

22. A composite fabric made by the method of claim 1.

23. A composite fabric made by the method of claim 14.

24. The method of claim 1 wherein the ratio of the dry weight of the first layer to the dry weight of the second layer ranges from about 0.1 to about 2.

25. The method of claim 1 wherein the ratio of the dry weight of the first layer to the dry weight of the second layer ranges from about 0.2 to about 1.

26. A method of forming a nonwoven composite fabric comprising the steps of:

providing a first layer comprising splittable spunbond fibers, the splittable spunbond fibers comprising a first thermoplastic polymer and a second thermoplastic polymer arranged in distinct zones across the cross-section of the fibers, the first and second thermoplastic polymers being incompatible with each other;

splitting at least a portion of the splittable spunbond fibers into split filaments;

thereafter, superposing a second layer and said first layer, wherein said second layer comprises pulp fibers; and entangling the first and second layers to form a composite fabric.

27. The method of claim 26 wherein the splitting step comprises impinging the splittable spunbond fibers with first high energy hydraulic jets, and wherein the entangling step comprises impinging the superposed first and second layers with second high energy hydraulic jets.

28. The method of claim 27 wherein the first jets are supplied through first orifices, the hydraulic pressure at the first orifices ranging from about 2,500 kPa to about 21,000 kPa.

29. The method of claim 27 wherein the second jets are supplied through second orifices, the hydraulic pressure at the second orifices ranging from about 1,300 kPa to about 14,000 kPa.

30. The method of claim 27 wherein the first and second jets are supplied through first and second orifices respectively, the hydraulic pressure at the second orifices being lower than the hydraulic pressure at the first orifices.

31. A composite fabric made by the method of claim 26.

* * * * *